United States Patent
Kobayashi

(10) Patent No.: US 9,264,641 B2
(45) Date of Patent: Feb. 16, 2016

(54) PHOTOELECTRIC CONVERSION APPARATUS

(71) Applicant: CANON KABUSHIKI KAISHA, Tokyo (JP)

(72) Inventor: Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 14/220,276

(22) Filed: Mar. 20, 2014

(65) Prior Publication Data

US 2014/0312210 A1    Oct. 23, 2014

(30) Foreign Application Priority Data

Apr. 22, 2013    (JP) .................... 2013-089703

(51) Int. Cl.
  *H01L 27/144* (2006.01)
  *H01L 27/146* (2006.01)
  *H04N 5/3745* (2011.01)

(52) U.S. Cl.
  CPC .................... *H04N 5/3745* (2013.01)

(58) Field of Classification Search
  CPC . H04N 5/374; H04N 5/3745; H01L 27/14643
  See application file for complete search history.

(56) References Cited

U.S. PATENT DOCUMENTS

| | | | |
|---|---|---|---|
| 7,990,440 B2 | 8/2011 | Kobayashi et al. | |
| 8,325,259 B2 * | 12/2012 | Kobayashi | H01L 31/02005 348/302 |
| 8,552,357 B2 * | 10/2013 | Kobayashi | G01J 1/42 250/214 R |
| 8,710,558 B2 | 4/2014 | Inoue et al. | |
| 8,835,828 B2 * | 9/2014 | Kobayashi | H01L 31/02019 250/214 R |
| 2010/0165161 A1 * | 7/2010 | Kobayashi | H01L 31/02005 348/300 |
| 2011/0215224 A1 * | 9/2011 | Kobayashi | G01J 1/42 250/208.2 |
| 2011/0278438 A1 | 11/2011 | Kobayashi | |
| 2013/0082343 A1 | 4/2013 | Fudaba et al. | |
| 2013/0140440 A1 | 6/2013 | Kobayashi | |
| 2014/0312210 A1 * | 10/2014 | Kobayashi | H04N 5/3745 250/214 A |

FOREIGN PATENT DOCUMENTS

JP    2000-077644    3/2000

\* cited by examiner

*Primary Examiner* — John Lee
(74) *Attorney, Agent, or Firm* — Fitzpatrick, Cella, Harper & Scinto

(57) ABSTRACT

An object of the present invention is to provide a photoelectric conversion apparatus which can enhance photo responsibility. A photoelectric conversion apparatus includes: a photoelectric conversion element configured to output a photo current generated by a photoelectric conversion; a detecting unit configured to detect a potential of an output terminal of the photoelectric conversion element; a feedback input unit configured to input a feedback signal based on the potential detected by the detecting unit; a current detecting unit configured to detect the photo current; and a current amplifier unit configured to generate an amplified current based on the photo current detected by the current detecting unit, and to output the amplified current to the feedback input unit, wherein the feedback input unit outputs a current derived by adding the photo current to the amplified current.

17 Claims, 8 Drawing Sheets

PHOTOELECTRIC CONVERSION APPARATUS

BACKGROUND OF THE INVENTION

1. Field of the Invention

The present invention relates to a photoelectric conversion apparatus.

2. Description of the Related Art

FIG. 1 in Japanese Patent Application Laid-Open No. 2000-077644 illustrates a photoelectric conversion apparatus which uses a phototransistor. In the figure, a constant current source and a MOSFET driven by the constant current source constitute a common source circuit, and a voltage between a gate and a source of the MOSFET determines a potential of a base of the phototransistor. In the figure, the photoelectric conversion apparatus is structured so that a collector current of the phototransistor changes when a light quantity changes, and accordingly a voltage between the base and an emitter changes, but at this time, not the potential of the base of the phototransistor but the potential of the emitter thereof mainly changes. The photoelectric conversion apparatus makes the potential of the emitter biased by a larger electric current (to HFE×photo current) change instead of the base biased by the photo current, and thereby enhances the photo responsibility. Specifically, the photoelectric conversion apparatus shortens a period of time between the time when the light quantity has changed and the time when the changes of the potential of the base and the potential of the emitter are completed.

In a common source circuit in Japanese Patent Application Laid-Open No. 2000-077644, the voltage between the base and the emitter increases linearly with respect to an exponential increase of the light quantity. This is because a relationship of the following expression (1) holds between a voltage Vbe between the base and the emitter and a collector current Ic.

$$I_c = I_s \times \exp(qV_{be}/kT) \quad (1)$$

Here, Is represents a saturation current, q represents a quantum of electricity, k represents the Boltzmann constant, and T represents an absolute temperature. When the light quantity increases, the potential of the base slightly increases. Thereby, the output of the common source circuit in FIG. 1 in Japanese Patent Application Laid-Open No. 2000-077644 decreases, and thereby the potential of the emitter is lowered. Because of this, when the light quantity changes, some variation occurs in the potential of the base as well. This variation still results in determining the rate of the photo responsibility. This is because a mirror effect works on a capacitance between the base and the emitter (junction capacitance of phototransistor), and the capacitance seems to be a large capacitance. The common source circuit works as an inverting amplifier, and thereby the emitter varies in a direction opposite to the change of the base. Suppose that the gain of the amplification due to the inversion from the base to the emitter is 20, for instance. The capacitance between the base and the emitter contributes to the common source circuit as 20-times capacitance, and even though the potential variation of the base is small, the amount of an electric charge necessary for charge becomes large. The rate of the photo responsibility is thereby determined.

SUMMARY OF THE INVENTION

According to an aspect of the present invention, a photoelectric conversion apparatus comprises: a photoelectric conversion element configured to output a photocurrent generated by a photoelectric conversion; a detecting unit configured to detect a voltage of an output terminal of the photoelectric conversion element; a feedback input unit configured to input a feedback signal based on the voltage detected by the detecting unit; a current detecting unit configured to detect the photocurrent; and a current amplifier unit configured to generate an amplified current based on the photocurrent detected by the current detecting unit, and to output the amplified current to the feedback input unit, wherein the feedback input unit outputs a current derived by adding the photocurrent to the amplified current.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
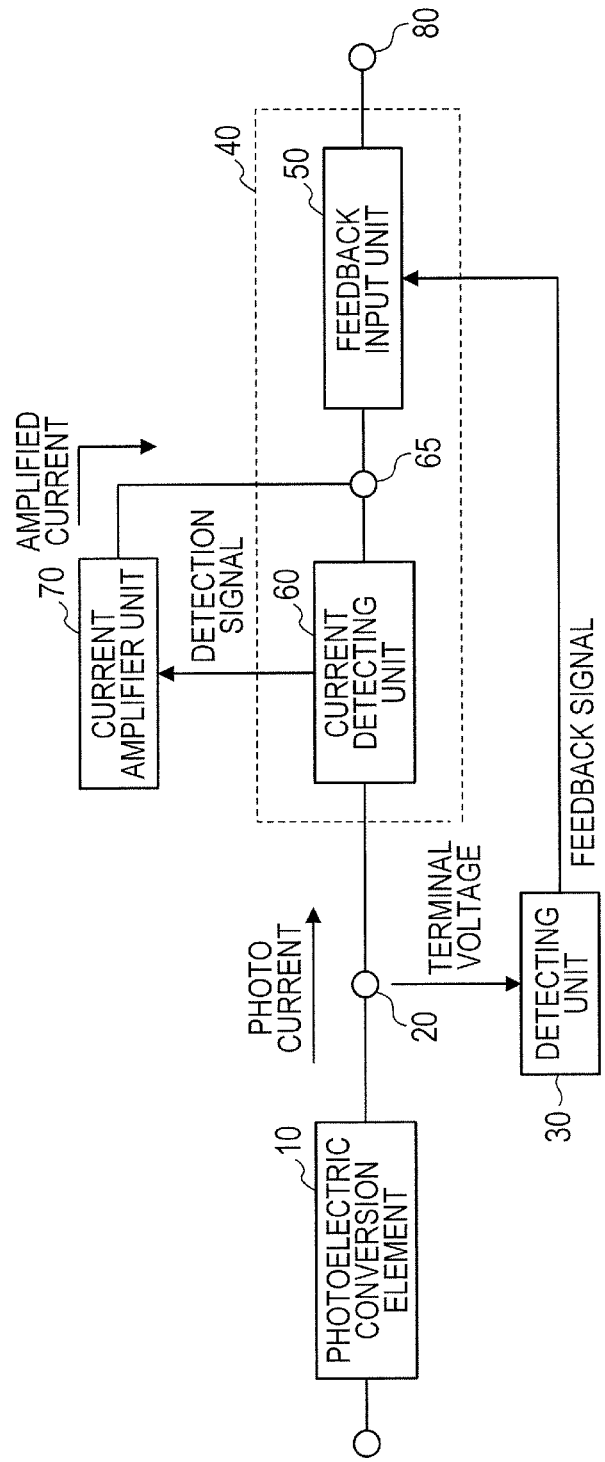
FIG. 1 is a view illustrating a configuration example of a first embodiment of the present invention.

FIG. 1 is a view illustrating a configuration example of a photoelectric conversion apparatus according to a first embodiment of the present invention. A photoelectric conversion apparatus in FIG. 1 has a photoelectric conversion element 10, a terminal 20 into which a photo current generated in the photoelectric conversion element 10 is input, a detecting unit 30 which detects a potential of the terminal 20, and a feedback unit which feeds back a feedback signal sent from the detecting unit 30 to the terminal 20. The photoelectric conversion element 10 outputs a photo current due to photoelectric conversion to the output terminal 20. In addition, the feedback unit 40 has a feedback input unit 50, a current detecting unit 60 and a terminal 65, and the current detecting unit 60 outputs a photo current sent from the photoelectric conversion element 10 to the terminal 65. In addition, the photoelectric conversion apparatus in FIG. 1 has a current amplifier unit 70 which generates an amplified current based on the detection signal sent from the current detecting unit 60.

The current amplifier unit 70 outputs an amplified current to the terminal 65. The photo current and the amplified current which have been input into the terminal 65 are summed up there, and are input into the feedback input unit 50. In addition, the photoelectric conversion apparatus in FIG. 1 has a current output terminal 80. The feedback input unit 50 receives the feedback signal based on the potential detected by the detecting unit 30, and outputs an electric current derived by adding the photo current to the amplified current, to the terminal 80.

The detecting unit 30 detects the potential of the output terminal 20 into which the photo current is input, and outputs a feedback signal to the feedback unit 40. The feedback unit 40 reduces the variation of the potential of the terminal 20 appearing when the photo current has changed, by applying feedback to the terminal 65. Specifically, the feedback input unit 50 varies the potential of the terminal 65 based on the feedback signal sent from the detecting unit 30, and thereby reduces the variation of the potential of the terminal 20. In addition, the capacitance between the terminal 20 and the terminal 65 is controlled to be small. Thereby, a photoelectric conversion apparatus having enhanced photo responsibility can be provided.

Figure 2:
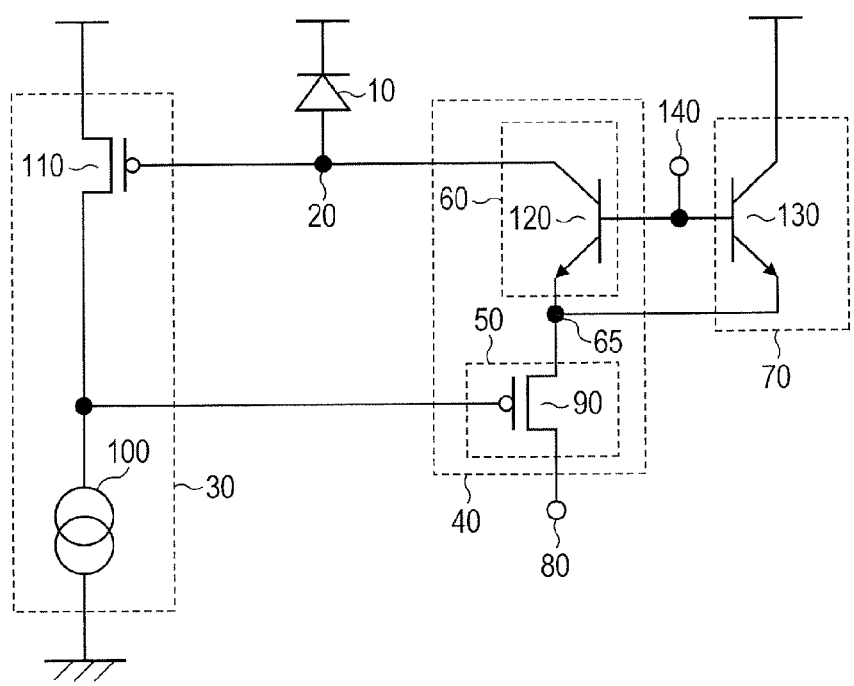
FIG. 2 is a view illustrating a configuration example of the first embodiment of the present invention.

FIG. 2 is a circuit diagram illustrating a configuration example of the photoelectric conversion apparatus in FIG. 1. Firstly, correspondences between FIG. 1 and FIG. 2 will be described below. In FIG. 2, the detecting unit 30 has a constant current source 100 and a first MOSFET 110. The feedback input unit 50 has a second MOSFET 90. The current detecting unit 60 has a bipolar transistor (third transistor) 120. The current amplifier unit 70 has a fourth bipolar transistor 130. A first reference potential terminal 140 is shown. In a p-channel MOSFET 110, the source is connected to a source potential node, and the gate is connected to the terminal 20. The constant current source 100 is connected between the drain of the MOSFET 110 and the ground potential node. The photoelectric conversion element 10 is a photodiode, for instance, in which the anode is connected to the terminal 20 and the cathode is connected to a source potential node. In an npn bipolar transistor 120, the collector is connected to the terminal 20, the base is connected to a reference potential terminal 140, and the emitter is connected to the terminal 65. A p-channel MOSFET 90 has the same polarity as that of the p-channel MOSFET 110, in which the source is connected to the terminal 65, the gate is connected to the drain of the MOSFET 110, and the drain is connected to the terminal 80. In an npn bipolar transistor 130, the collector is connected to a source potential node, the base is connected to the reference potential terminal 140, and the emitter is connected to the terminal 65.

The constant current source 100 and the MOSFET 110 constitute the common source circuit. The voltage between the gate and the source of the MOSFET 110 determines the potential of the terminal 20. The photo current generated in the photoelectric conversion element 10 becomes a collector current of the bipolar transistor 120. Because of this, when the photo current has increased, the voltage between the base and the emitter of the bipolar transistor 120 increases. At this time, a reference potential is given to the reference potential terminal 140, and because the potential is constant, the potential of the emitter of the bipolar transistor 120 is lowered. This lowering of the potential of the emitter occurs due to the lowering of the potential of the gate of the MOSFET 90, which is caused by the slight increase of the potential of the terminal 20. Thus the potential of the terminal 20 is approximately constant, but slightly varies when the photo current has varied, and thereby the potential of the emitter of the bipolar transistor 120 largely varies. Thus, the MOSFET 90 which is the feedback input unit 50 receives a feedback signal sent from the detecting unit 30, controls the potential of the terminal 65, and thereby can reduce the variation of the potential of the terminal 20. In addition, the bipolar transistor 130 generates an amplified current, and supplies the generated amplified current to the source of the MOSFET 90. The bipolar transistors 120 and 130 constitute a current mirror circuit, and accordingly the amplified current which is supplied from the bipolar transistor 130 is determined by a ratio of emitter areas of both the transistors 120 and 130. A mirror effect works on the capacitance between the collector and the emitter of the bipolar transistor 120, but the capacitance is small compared to the capacitance between the base and the emitter, to which a depletion layer capacitance and a diffusion capacitance contribute, and accordingly the capacitance associated to the terminal can be controlled to be small. Accordingly, a photoelectric conversion apparatus which enhances photo responsibility can be provided.

Incidentally, the depletion layer capacitance and the diffusion capacitance exist between the collector and the base of the bipolar transistor 120, but the potential of the reference potential terminal 140 is fixed, and accordingly the mirror effect does not work on those capacitances. In addition, when the photo current increases, the potential of the emitter of the bipolar transistor 120 is lowered, and at the same time, the voltage between the gate and the source of the MOSFET 90 increases. Accordingly, the potential of the gate of the MOSFET 90 is lowered. Because of this, a dynamic range of a circuit can be widened by setting the potential of the reference potential terminal 140 and the potential of the gate of the MOSFET 90 at high values. When the potential of the reference potential terminal 140 is set at a higher value than the potential of the terminal 20, the dynamic range can be enhanced by the setting of such a potential, because the bipolar transistor 120 can operate in an active region.

Figure 3:
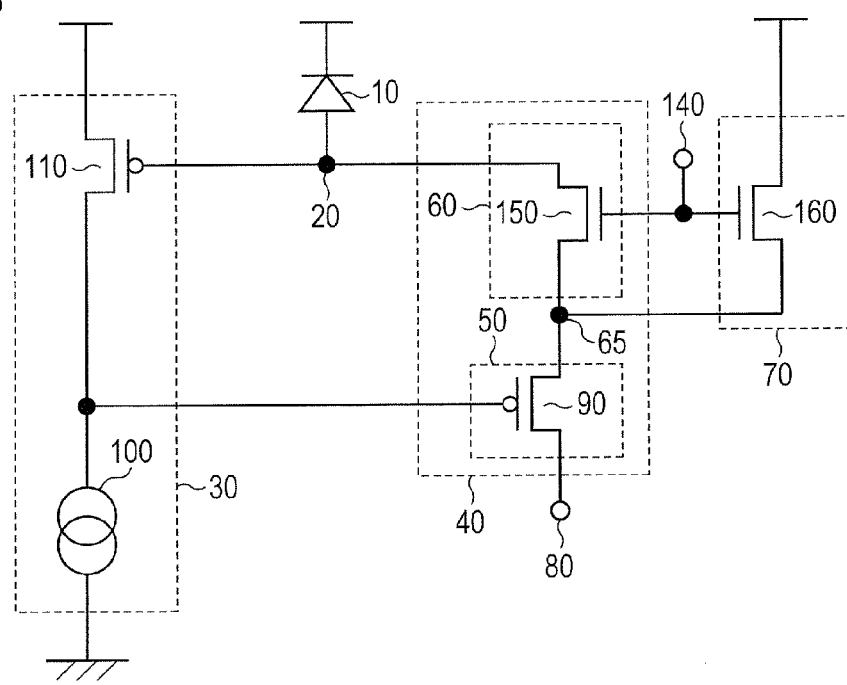
FIG. 3 is a view illustrating a configuration example of the first embodiment of the present invention.

The current detecting unit 60 and the current amplifier unit 70 are not limited to the bipolar transistors 120 and 130. For instance, as is illustrated in FIG. 3, n-channel MOSFETs 150 and 160 may be used as the current detecting unit 60 and the current amplifier unit 70, respectively. In the MOSFET (third transistor) 150, the drain is connected to the terminal 20, the gate is connected to the reference potential terminal 140, and the source is connected to the terminal 65. The fourth MOSFET 160 has a reverse polarity of that of the p-channel MOSFET 110, in which the drain is connected to a source potential node, the gate is connected to the reference potential terminal 140, and the source is connected to the terminal 65. A drain current Id flowing when the MOSFETs 150 and 160 operate in a weak inversion region exponentially increases with respect to the voltage Vgs between the gate and the source, as in the following formula (2).

$$I_d \propto \exp(qV_{gs}/kT) \quad (2)$$

Here, q represents a quantum of electricity, k represents the Boltzmann constant, and T represents an absolute temperature. Because of this, when the photo current exponentially increases, the voltage between the gate and the source of the MOSFET 150 linearly increases. At this time, a reference potential is given to the reference potential terminal 140 and the potential is fixed. Accordingly, the source potential of the MOSFET 150 is lowered. At this time, the variation of the potential of the terminal 20 is controlled to be a slight increase. In addition, the MOSFETs 150 and 160 constitute the current mirror circuit, and accordingly the amplified current which is supplied from the MOSFET 160 is determined by a ratio between (W/L) in both the transistors 150 and 160.

W is a width of the gate, and L is a length of the gate. The capacitance between the drain and the source of the MOSFET 150 is small on which the mirror effect works, and accordingly the capacitance associated to the terminal 20 can be controlled to be small.

Figure 4:
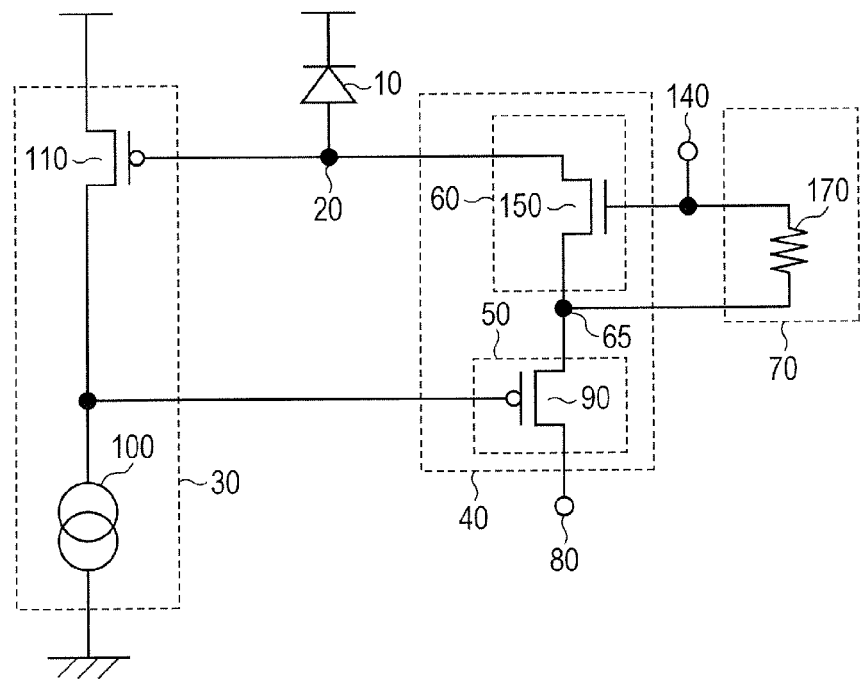
FIG. 4 is a view illustrating a configuration example of the first embodiment of the present invention.

In addition, a resistor 170 may be used for the current amplifier unit 70, as is illustrated in FIG. 4. The resistor 170 is connected between the reference potential terminal 140 and the terminal 65. When the photo current generated in the photoelectric conversion element increases, the source potential of the MOSFET 150 is lowered. Thereby, the voltage between both ends of the resistor 170 increases by the lowered amount, and the amplified current increases which flows into the terminal 65 from the reference potential terminal 140 through the resistor 170. When the amount of increase in the photo current is represented by $\Delta Id$, a transconductance of the MOSFET 150 is represented by gm, and the amount of decrease in the potential of the source of the MOSFET 150 is represented by $\Delta Vgs$, an expression $\Delta Id = gm \cdot \Delta Vgs$ holds. On the other hand, when a resistance value of the resistor 170 is represented by R, the amount of increase $\Delta Ir$ in the electric current in the resistor 170 is expressed by $\Delta Ir = \Delta Vgs/R$. A current amplification factor $\Delta Ir/\Delta Id$ is expressed by the following expression (3), from a ratio between both the amounts.

$$\frac{\Delta I_r}{\Delta I_d} = \frac{1}{gm \cdot R} \quad (3)$$

Figure 5:
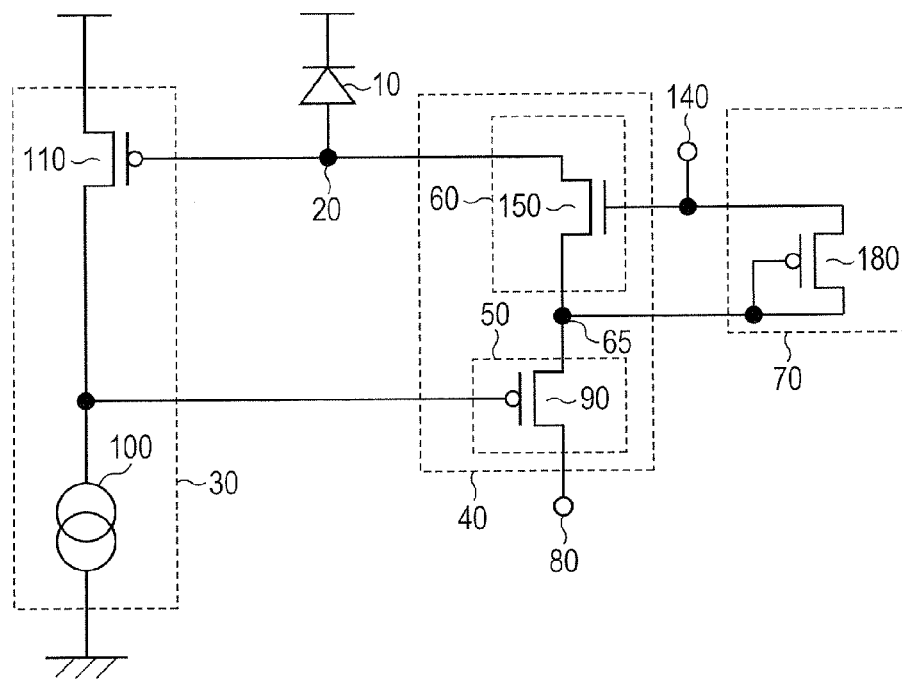
FIG. 5 is a view illustrating a configuration example of the first embodiment of the present invention.

In addition, an n-channel MOSFET 180 having a reverse polarity of that of the n-channel MOSFET 150 may be used for the current amplifier unit 70, as is illustrated in FIG. 5. In the fourth MOSFET 180, the source is connected to the reference potential terminal 140, and the gate and the drain are connected to the terminal 65. The on resistance of the MOSFET 180 becomes approximately 1/gmp. Here, the gmp is the transconductance of the MOSFET 180. The current amplification factor $\Delta Ir/\Delta Id$ becomes gmp/gm by substitution of 1/gmp into R in Expression (3).

Figure 6:
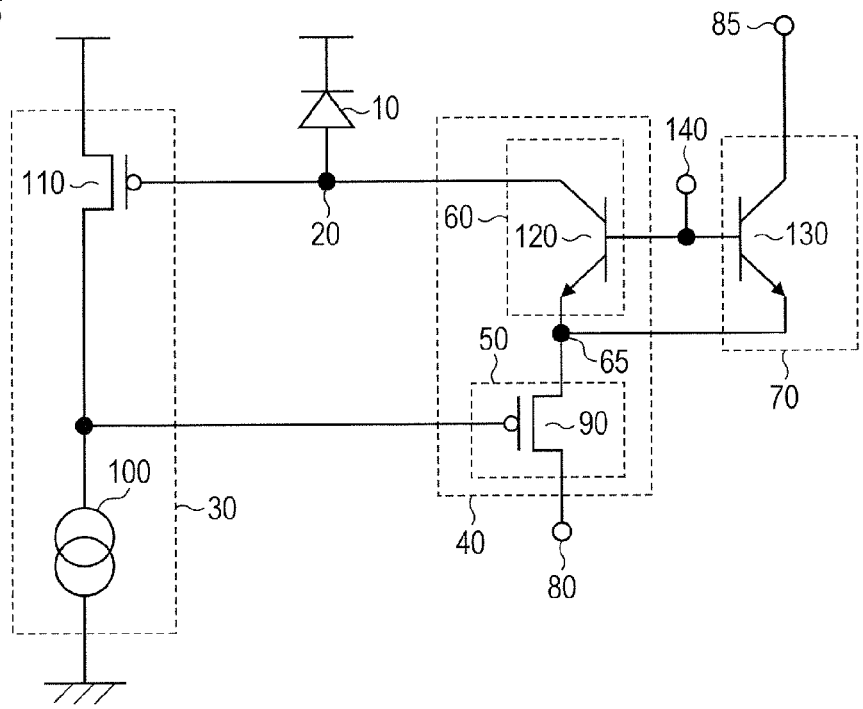
FIG. 6 is a view illustrating a configuration example of the first embodiment of the present invention.

In addition, when a second current output terminal 85 is provided as is illustrated in FIG. 6, the amplified current can be taken out also from the second current output terminal 85. In the bipolar transistor 130, the collector is connected to the second current output terminal 85, the base is connected to the reference potential terminal 140, and the emitter is connected to the terminal 65. In the present embodiment, an electric current can be output from the first current output terminal 80 and the second current output terminal 85. In addition, in FIG. 4 and FIG. 5, the amplified current can be taken out also from the reference potential terminal 140.

Second Embodiment

Figure 7:
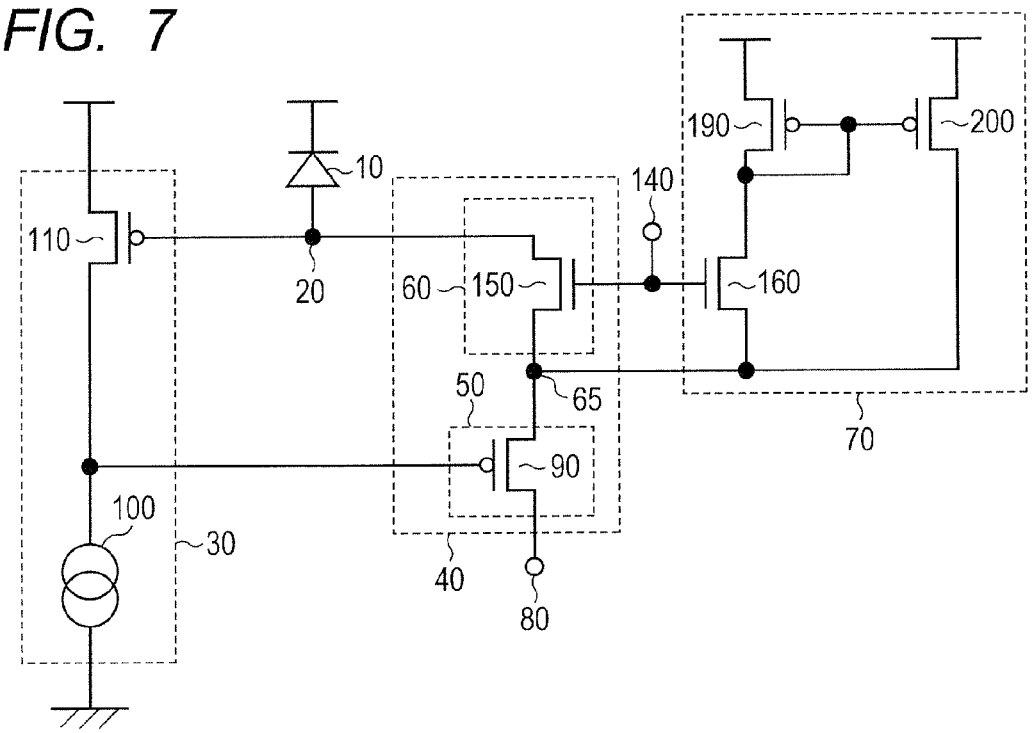
FIG. 7 is a view illustrating a configuration example of a second embodiment of the present invention.

FIG. 7 is a circuit diagram illustrating a configuration example of a photoelectric conversion apparatus according to a second embodiment of the present invention. Hereafter, only the points will be described at which the present embodiment is different from the above described first embodiment (FIG. 3). The current amplifier unit 70 has a current mirror circuit which includes p-channel MOSFETs 190 and 200, as a second current amplifier unit, in addition to the MOSFET 160. The p-channel MOSFETs 190 and 200 are MOSFETs having the same polarity as the p-channel MOSFET 110. In the fifth MOSFET 190, the source is connected to a source potential node, and the gate and the drain are connected to the drain of the MOSFET 160. In the sixth MOSFET 200, the source is connected to a source potential node, the gate is connected to the gate of the MOSFET 190, and the drain is connected to the terminal 65. Thereby, the number of the total elements can be reduced which shall be needed to the current amplifier unit 70 when the current amplifier unit 70 is intended to have a high current amplification factor.

For instance, in FIG. 3, when it is desired that the MOSFET 160 outputs an amplified current which is 20 times as large as a drain current of the MOSFET 150, in other words, a photo current, the gate width of the MOSFET 160 needs to be set to be 20 times as large as that of the MOSFET 150, if the gate lengths of the MOSFETs 150 and 160 are equal to each other. Specifically, the MOSFET 160 shall include 20 pieces of the MOSFETs connected in parallel, which have the same size as that of the MOSFET 150. On the other hand, in FIG. 7, suppose that the gate lengths of the MOSFETs 150, 160, 190 and 200 are equal to each other. In addition, suppose that the gate widths of the MOSFETs 150 and 190 are equal. In this case, if the gate width of the MOSFET 160 is set to be 5 times as large as that of the MOSFET 150, and the gate width of the MOSFET 200 is set to be 3 times as large as that of the MOSFET 190, the amplified current which is 5 times as large as the photo current is obtained from the MOSFET 160, and the amplified current which is 15 times as large as the photo current is obtained from the MOSFET 200. Therefore, the amplified current which is 20 times as large as the photo current in total is obtained. At this time, a 20-times amplification factor is obtained by 9 pieces of elements in total of the MOSFETs 160, 190 and 200. Therefore, the number of the elements can be reduced.

Incidentally, it is desirable from the viewpoint of responsibility to control the amplification factor of the current mirror circuit which is obtained by the MOSFETs 150 and 160 so as to be higher than the amplification factor of the current mirror circuit which is obtained by the MOSFETs 190 and 200. Thereby, the drain current of the MOSFET 160 can be increased, the gate width of the MOSFET 200 is also reduced, and thereby the capacitance associated to the gates of the MOSFETs 190 and 200 can be reduced. Therefore, the responsibility can be enhanced.

Third Embodiment

Figure 8:
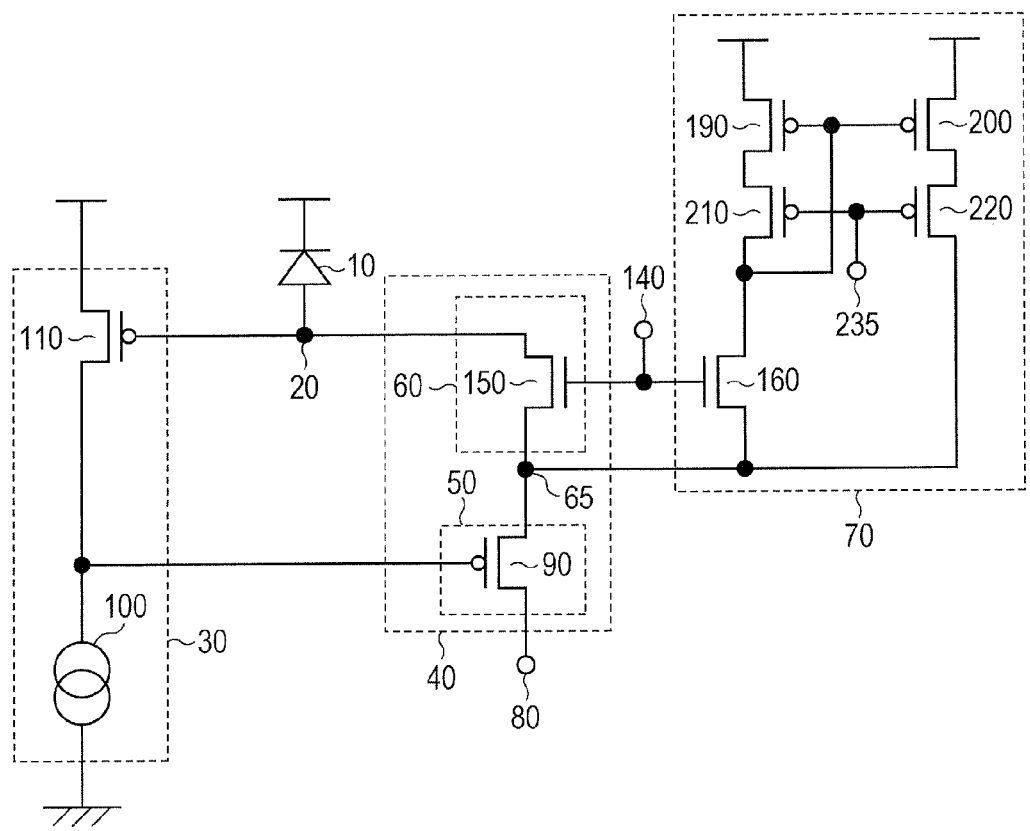
FIG. 8 is a view illustrating a configuration example of a third embodiment of the present invention.

FIG. 8 is a circuit diagram illustrating a configuration example of a photoelectric conversion apparatus according to a third embodiment of the present invention. Hereafter, only the points will be described at which the present embodiment is different from the above described second embodiment (FIG. 7). The current amplifier unit 70 further has p-channel MOSFETs 210 and 220, and a second reference potential terminal 235. The p-channel MOSFETs 190, 200, 210 and 220 are MOSFETs having the same polarity as that of a p-channel MOSFET 110. In the fifth MOSFET 190, the source is connected to a source potential node, and the gate is connected to the drain of the MOSFET 160. In the sixth MOSFET 200, the source is connected to a source potential node, and the gate is connected to the gate of the MOSFET 190. In the seventh MOSFET 210, the source is connected to the drain of the MOSFET 190, the gate is connected to the second reference potential terminal 235, and the drain is connected to the drain of the MOSFET 160. In the eighth MOSFET 220, the source is connected to the drain of the MOSFET 200, the gate is connected to the second reference potential terminal 235, and the drain is connected to the terminal 65. The MOSFETs 210 and 220 play a role of reducing the variation of the drain voltage of the MOSFETs 190 and 200, and thereby enable the light quantity dependency of a gain of an electric current to be reduced and the linearity thereof to be enhanced.

The gain of an electric current by the MOSFETs 190 and 200 in the current mirror circuit will be derived, firstly in the case where there are not the MOSFETs 210 and 220, in other words, in the case of FIG. 7. Now, it is assumed that the MOSFETs 190 and 200 are operating in a saturation region. At this time, a drain current Id of the general MOSFET is expressed by the following expression (4).

$$I_d = \frac{\beta}{2}(V_{gs} - V_{th})^2(1 + \lambda V_{ds}) \quad (4)$$

Here, Vth represents a threshold voltage, and λ represents a channel length modulation coefficient. In addition, β is as in the following formula (5). Here, µ0 represents a mobility of a carrier, $C_{ox}$ represents a gate capacitance per unit area of the MOSFET, W represents a gate width of the MOSFET, and L represents a gate length of the MOSFET.

$$\beta = \mu_0 C_{ox} \frac{W}{L} \quad (5)$$

Here, suppose that a gate length of the MOSFET 190 is represented by L1, a gate width thereof is represented by W1, a drain current thereof is represented by $I_{d1}$, a gate length of the MOSFET 200 is represented by L2, a gate width thereof is represented by W2, and a drain current thereof is represented by $I_{d2}$. Then, an electric current gain $\Delta I_{d2}/\Delta I_{d1}$ can be derived as the following expression (6), from Expression (4) and Expression (5).

$$\frac{\Delta I_{d2}}{\Delta I_{d1}} \approx \frac{(W2/L2)}{(W1/L1)} \frac{(1 + \lambda 2 \times Vds2)}{(1 + \lambda 1 \times Vds1)} \quad (6)$$

Here, Vds1 represents a voltage between the drain and the source of the MOSFET 190, and Vds2 represents a voltage between the drain and the source of the MOSFET 200. In addition, λ1 represents a channel length modulation coefficient of the MOSFET 190, and λ2 represents a channel length modulation coefficient of the MOSFET 200. In FIG. 7, the voltages Vds1 and Vds2 between the drains and the sources depend on the photo current. Therefore, according to Expression (6), the gain $\Delta I_{d2}/\Delta I_{d1}$ of the electric current mildly depends on the light quantity. In contrast to this, in FIG. 8, the gain $\Delta I_{d2}/\Delta I_{d1}$ of the electric current is expressed by the following expression (7).

$$\frac{\Delta I_{d2}}{\Delta I_{d1}} \approx \frac{(W2/L2)}{(W1/L1)} \frac{\left(1 + \frac{\lambda 2 \times Vds2}{gm2 \times r2}\right)}{\left(1 + \frac{\lambda 1 \times Vds1}{gm1 \times r1}\right)} \quad (7)$$

Here, gm1 and r1 represent a transconductance and an output resistance of the MOSFET 210, respectively, and gm2 and r2 represent a transconductance and an output resistance of the MOSFET 220, respectively. The voltages Vds1 and Vds2 are reduced each by a factor of gm×r, and thereby the results are expressed by Expression (7). It is understood from Expression (6) and Expression (7) that the MOSFETs 210 and 220 reduce the variation of the drain voltages of the MOSFETs 190 and 200, and thereby reduce the light quantity dependency of the gain of the electric current and can enhance the linearity thereof.

Fourth Embodiment

Figure 9:
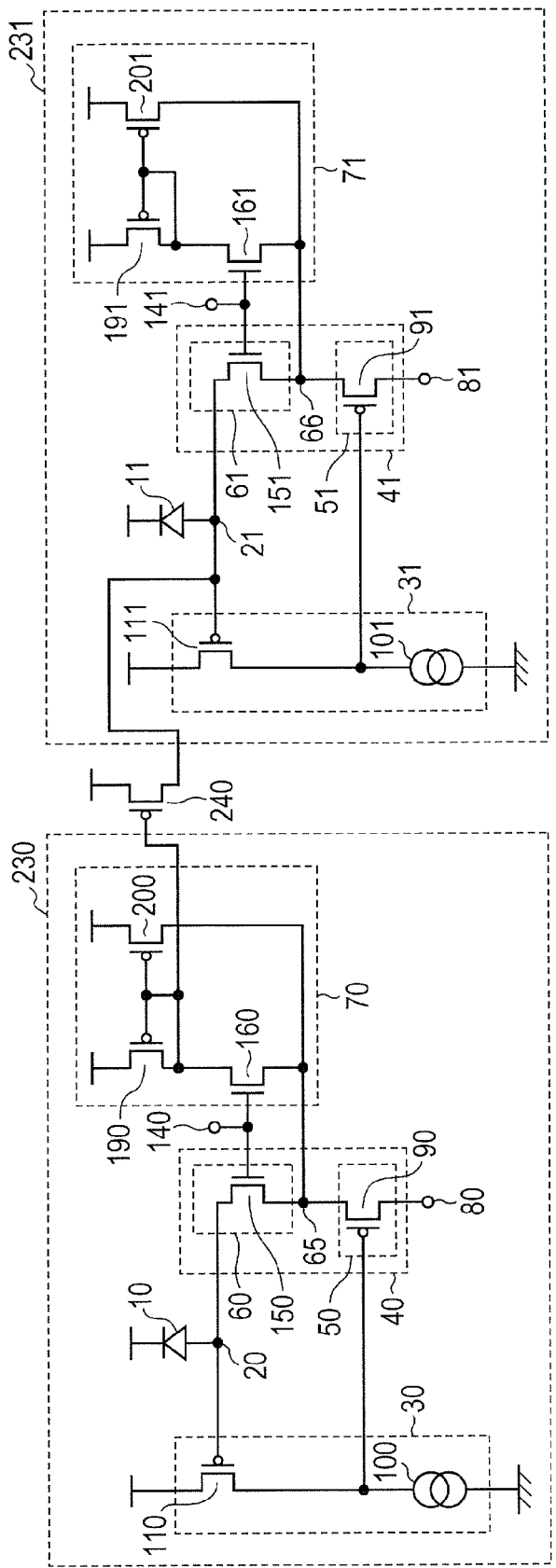
FIG. 9 is a view illustrating a configuration example of a fourth embodiment of the present invention.

FIG. 9 is a circuit diagram illustrating a configuration example of a photoelectric conversion apparatus according to a fourth embodiment of the present invention. Hereafter, only the points will be described at which the present embodiment is different from the above described second embodiment (FIG. 7). The photoelectric conversion apparatus has a first photoelectric conversion apparatus 230, a second photoelectric conversion apparatus 231, and a p-channel MOSFET 240. The first photoelectric conversion apparatus 230 has a configuration of the photoelectric conversion apparatus in FIG. 7. The second photoelectric conversion apparatus 231 has a similar configuration to that of the first photoelectric conversion apparatus 230. A detecting unit 31 corresponds to the detecting unit 30, an MOSFET 111 corresponds to the MOSFET 110, and a current source 101 corresponds to the current source 100. A photoelectric conversion element 11 corresponds to the photoelectric conversion element 10, and a terminal 21 corresponds to the terminal 20. A feedback unit 41 corresponds to the feedback unit 40, a feedback input unit 51 corresponds to the feedback input unit 50, and a current detecting unit 61 corresponds to the current detecting unit 60. MOSFETs 91 and 151 correspond to the MOSFETs 90 and 150, respectively. A reference potential terminal 141 corresponds to the reference potential terminal 140, and a current amplifier unit 71 corresponds to the current amplifier unit 70. MOSFETs 161, 191 and 201 correspond to the MOSFETs 160, 190 and 200, respectively. In a ninth MOSFET 240, the source is connected to a source potential node, the gate is connected to the gate of the MOSFET 190, and the drain is connected to the terminal 21. The electric current supplied from the MOSFET 240 further enables the responsibility of the second photoelectric conversion apparatus 231 to be enhanced.

An electric current which is generated by the amplification of a photo current of the photoelectric conversion element 10 flows in the MOSFET 190. If the size of the MOSFET 240 is equal to that of the MOSFET 190, the same electric current as that of the MOSFET 190 flows in the MOSFET 240. This photoelectric conversion apparatus supplies this electric current to the terminal 21 to increase the speed of charge to the terminal 21, and thereby can further enhance the responsibility. However, when the sensitivity of the photoelectric conversion element 10 is lower than the sensitivity of the photoelectric conversion element 11, and the photo current to be generated is smaller, or when the capacitance associated to the terminal 20 is larger than the capacitance associated to the terminal 21, the responsibility of the electric current of the MOSFET 240 results in deteriorating. Thereby, the effect of enhancing the photo responsibility is not obtained. This is because the completion of the charge to the terminal 20 due to the photo current of the photoelectric conversion element 10 becomes late with respect to the charge to the terminal 21 due to the photo current of the photoelectric conversion element 11, and thereby after the charge to the terminal 21 has been finished, the electric current of the MOSFET 240 is settled. Accordingly, the capacitance associated to the terminal 20 of the anode of the photodiode 10 of the first photoelectric conversion apparatus 230 can be smaller than the capacitance associated to the terminal 21 of the anode of the photodiode 11 of the second photoelectric conversion apparatus 231.

Fifth Embodiment

Figure 10:
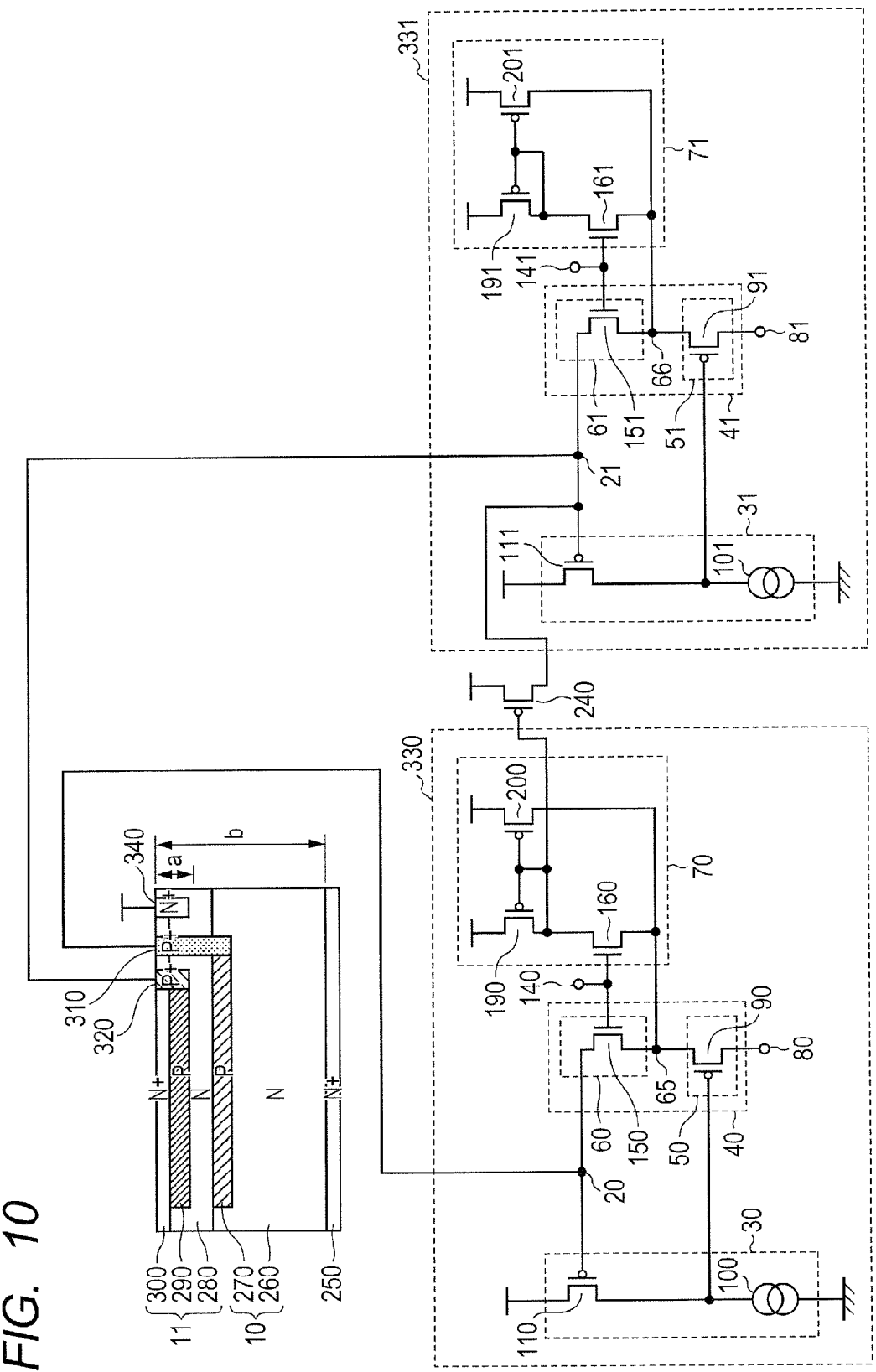
FIG. 10 is a view illustrating a configuration example of a fifth embodiment of the present invention.

FIG. 10 is a view illustrating a configuration example of a photoelectric conversion apparatus according to a fifth embodiment of the present invention. Hereafter, only the points will be described at which the present embodiment is different from the above described fourth embodiment. A first read out circuit 330 in FIG. 10 and a first photoelectric conversion element 10 correspond to the first photoelectric conversion apparatus 230 in FIG. 9. The first read out circuit 330 is a circuit in which the photoelectric conversion element 10 is removed from the first photoelectric conversion apparatus 230 in FIG. 9. A second read out circuit 331 in FIG. 10 and a second photoelectric conversion element 11 correspond to the second photoelectric conversion apparatus 231 in FIG. 9. The second read out circuit 331 is a circuit in which the photoelectric conversion element 11 is removed from the second photoelectric conversion apparatus 231 in FIG. 9.

An N-type region 260, a P-type region 270, an N-type region 280, a P-type region 290 and a surface $N^+$ region 300 are stacked on an $N^+$ region 250. In other words, a plurality of N-type regions (first conductivity type) and P-type regions (second conductivity type) are alternately stacked on each other. The second conductivity type is a reverse electroconductive type of the first electroconductive type. The P-type regions 270 and 290 are formed so that the depths are different from each other. A light having a longer wave length among lights incident on silicon more deeply penetrates, accordingly light signals in response to the lights having different wave length bands can be obtained from the P-type regions 270 and 290, respectively. The first photoelectric conversion element 10 of the first photoelectric conversion apparatus 330 is formed of the N-type region 260, the P-type region 270 and the N-type region 280. The second photoelectric conversion element 11 of the second photoelectric conversion apparatus 331 is formed of the N-type region 280, the P-type region 290 and the surface $N^+$ region 300. The photoelectric conversion elements 10 and 11 are stacked in the depth direction. In the configuration, contact portions 310 and 320 are provided in the P-type regions 270 and 290, respectively, and the photo currents are read out from the respective photoelectric conversion elements 10 and 11. The first read out circuit 330 reads out a signal from the first photoelectric conversion element 10, and the second read out circuit 331 reads out a signal from the second photoelectric conversion element 11. In addition, an N-type contact portion 340 is provided in the N-type region 280 and the surface $N^+$ type region 300, and the N-type contact portion 340 is connected to a source voltage terminal.

Figure 11:
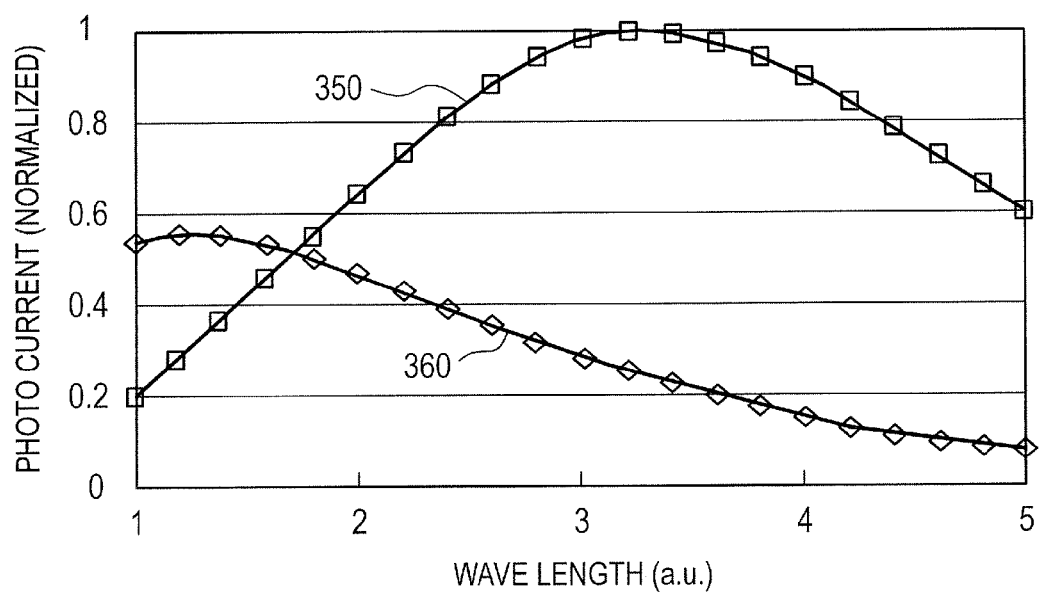
FIG. 11 is a view illustrating an example of spectral characteristics according to the fifth embodiment of the present invention.

In FIG. 10, a represents a position of the peak in an impurity profile in a depth direction of the N-type region 280, and b represents the total thickness of the semiconductor layer formed on the $N^+$ region 250. Spectral characteristics of the photoelectric conversion elements 10 and 11 are mainly determined by the two factors of a and b. FIG. 11 illustrates a simulation result of the spectral characteristics when a and b are certain values. In FIG. 11, a horizontal axis indicates a wave length of irradiated light, and a vertical axis indicates a photo current obtained from each of the photoelectric conversion elements 10 and 11. Characteristics 360 of the second photoelectric conversion element 11 and characteristics 350 of the first photoelectric conversion element 10 are shown. In the case of the spectral characteristics as in FIG. 11, the photoelectric conversion element 11 cannot output a smaller photo current than the photoelectric conversion element 10, in response to any light source having almost any spectral characteristics. Because of this, the speed of the charge to the terminal 21 becomes later than the speed of the charge to the terminal 20, and accordingly the responsibility of the electric current which is output from the current output terminal 81 becomes worse than the responsibility of the electric current that is output from the current output terminal 80. Then, an electric current is supplied to the terminal 21 from the MOSFET 240, which thereby increases the speed of the charge to the terminal and can enhance the responsibility of the electric current that is output from the current output terminal 81. The sensitivities of the photoelectric conversion elements 10 and 11 are proportional to the total number of the photocarriers which are generated when the photoelectric conversion elements are irradiated with white light.

Incidentally, if a signal based on an output current from the current output terminal 81 and a signal based on an output current from the current output terminal 80 are subjected to differential processing, a signal component of the photo current characteristics 350 is removed and a signal having the photo current characteristics 360 can be obtained.

In the above described first to fifth embodiments, the case has been taken as an example, where a transistor of a type of collecting a hole has been used as the photoelectric conversion elements 10 and 11, but the case is not limited to the type. In the case as well where a transistor of a type of collecting an electron has been used as the photoelectric conversion elements 10 and 11, a similar effect can be obtained if the photoelectric conversion elements are similarly configured. In addition, the case has been taken as an example, where a common source circuit has been used as the detecting units 30 and 31, but the case is not limited to the common source circuit. For instance, an inverting amplifier which uses an operational amplifier may be used.

In addition, in the above described first to fifth embodiments, the case has been taken as an example, where the MOSFETs 90 and 91 have been used as the feedback input units 50 and 51, but the case is not limited to the MOSFET. For instance, a bipolar transistor may be used. In addition, the case has been taken as an example, where the MOSFET or the bipolar transistor has been used as the current detecting units 60 and 61, but the case is not limited to the MOSFET or the bipolar transistor.

In addition, in the first and second embodiment, the case has been taken as an example, where the MOSFET, the bipolar transistor or the resistor has been used as the current amplifier units 70 and 71, but the case is not limited to the MOSFET, the bipolar transistor or the resistor. In addition, in the fifth embodiment, the case has been taken as an example, where the number of the photoelectric conversion elements 10 and 11 stacked in the depth direction has been 2, but the case is not limited to 2.

Note that the above embodiments are merely examples of how the present invention can be practiced, and the technical scope of the present invention should not be restrictedly interpreted by the embodiments. In other words, the present invention can be practiced in various ways without departing from the technical concept or main features of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-089703, filed Apr. 22, 2013, which is hereby incorporated by reference herein in its entirety.

What is claimed is:

1. A photoelectric conversion apparatus comprising:
a photoelectric conversion element configured to output a photocurrent generated by a photoelectric conversion;
a detecting unit configured to detect a voltage of an output terminal of the photoelectric conversion element;
a feedback input unit configured to input a feedback signal based on the voltage detected by the detecting unit;
a current detecting unit configured to detect the photocurrent; and
a current amplifier unit configured to generate an amplified current based on the photocurrent detected by the current detecting unit, and to output the amplified current to the feedback input unit, wherein
the feedback input unit outputs a current derived by adding the photocurrent to the amplified current.

2. The photoelectric conversion apparatus according to claim 1, wherein
the photoelectric conversion element is a photodiode,
the detecting unit has a first MOSFET having a gate connected to the output terminal, which is an anode of the photodiode, and having a source connected to a source voltage node, and has a constant current source connected to the first MOSFET, and
the feedback input unit has a second MOSFET of a same polarity as a polarity of the first MOSFET, wherein the second MOSFET has a gate connected to a drain of the first MOSFET, and has a drain outputting the current derived by adding,
the current detecting unit has a third transistor having a collector or a drain connected to the anode of the photodiode, having a base or a gate connected to a first reference voltage terminal, and having an emitter or a source connected to a source of the second MOSFET.

3. The photoelectric conversion apparatus according to claim 2, wherein
the third transistor is a MOSFET of a polarity opposite to the polarity of the first MOSFET, having the drain connected to the anode of the photodiode, having the gate connected to the first reference voltage terminal, and having the source connected to the source of the second MOSFET.

4. The photoelectric conversion apparatus according to claim 2, wherein
the third transistor is a bipolar transistor having the collector connected to the anode of the photodiode, having the base connected to the first reference voltage terminal, and having the emitter connected to the source of the second MOSFET.

5. The photoelectric conversion apparatus according to claim 3, wherein
the current amplifier unit has a fourth MOSFET of a polarity opposite to a polarity of the first MOSFET,
the fourth MOSFET has a gate connected to the first reference voltage terminal, and a source connected to the source of the second MOSFET.

6. The photoelectric conversion apparatus according to claim 4, wherein
the current amplifier unit has a fourth bipolar transistor,
the fourth bipolar transistor has a base connected to the first reference voltage terminal, and a emitter connected to the source of the second MOSFET.

7. The photoelectric conversion apparatus according to claim 2, wherein
the current amplifier unit has a fourth MOSFET of a same polarity as a polarity of the first MOSFET,
the fourth MOSFET has a source connected to the first reference voltage terminal, and a gate and a drain connected to the source of the second MOSFET.

8. The photoelectric conversion apparatus according to claim 2, wherein
the current amplifier unit has a resistor connected between the first reference voltage terminal and the source of the second MOSFET.

9. The photoelectric conversion apparatus according to claim 2, wherein
a voltage of the first reference voltage terminal is higher than a voltage of the anode of the photodiode.

10. The photoelectric conversion apparatus according to claim 5, wherein
the current amplifier unit has a current mirror circuit.

11. The photoelectric conversion apparatus according to claim 10, wherein
the current mirror circuit has fifth and sixth MOSFET's of a same polarity as a polarity of the first MOSFET,
the fifth MOSFET has a gate and a drain connected to the drain of the fourth MOSFET,
the sixth MOSFET has a gate connected to the gate of the fifth MOSFET, and has a drain connected to the source of the second MOSFET.

12. The photoelectric conversion apparatus according to claim 10, wherein
the current mirror circuit has fifth, sixth, seventh and eights MOSFET's of a same polarity as a polarity of the first MOSFET,
the fifth MOSFET has a gate and a drain connected to the drain of the fourth MOSFET,
the sixth MOSFET has a gate connected to the gate of the fifth MOSFET,
the seventh MOSFET has a source connected to the drain of the fifth MOSFET, has a gate connected to the second reference voltage terminal and has a drain connected to the drain of the fourth MOSFET, and
the eighth MOSFET has a source connected to the drain of the sixth MOSFET, has a gate connected to the second reference voltage terminal and has a drain connected to the source of the second MOSFET.

13. The photoelectric conversion apparatus according to claim 11, comprising:
a first photoelectric conversion apparatus having the photoelectric conversion element, the detecting unit, the feedback input unit, the current detecting unit and the current amplifier unit;
a second photoelectric conversion apparatus having the photoelectric conversion element, the detecting unit, the feedback input unit, the current detecting unit and the current amplifier unit; and
a ninth MOSFET having a gate connected to the gate of the fifth MOSFET of the first photoelectric conversion apparatus, and having a drain connected to the anode of the photodiode.

14. The photoelectric conversion apparatus according to claim 13, wherein
a sensitivity of the photoelectric conversion element of the first photoelectric conversion apparatus is higher than a sensitivity of the photoelectric conversion element of the second photoelectric conversion apparatus.

15. The photoelectric conversion apparatus according to claim 13, wherein
a charge associated to the anode of the photodiode of the first photoelectric conversion apparatus is smaller than a charge associated to the anode of the photodiode of the second photoelectric conversion apparatus.

16. The photoelectric conversion apparatus according to claim 13, wherein
the photoelectric conversion element of the first photoelectric conversion apparatus, and the photoelectric conversion element of the second photoelectric conversion apparatus comprise a region of a first conductivity type and a region of a second conductivity type, alternately stacked one on the another to form a plurality of stacked layer.

17. The photoelectric conversion apparatus according to claim 16, wherein
a signal based on an output current from the first photoelectric conversion apparatus and a signal based on an output current from the second photoelectric conversion apparatus are subjected to a differential processing.

* * * * *